(12) United States Patent
Bourke

(10) Patent No.: US 6,719,911 B2
(45) Date of Patent: Apr. 13, 2004

(54) APPARATUS AND METHOD FOR THE TREATMENT OF A CONTAMINATED FLUID

(75) Inventor: Edward Bourke, Boynton Beach, FL (US)

(73) Assignee: CLRPRO, Inc., Boynton Beach, FL (US)

( * ) Notice: Subject to any disclaimer, the term of this patent is extended or adjusted under 35 U.S.C. 154(b) by 0 days.

(21) Appl. No.: 10/368,353

(22) Filed: Feb. 20, 2003

(65) Prior Publication Data
US 2003/0155306 A1 Aug. 21, 2003

Related U.S. Application Data

(60) Provisional application No. 60/357,658, filed on Feb. 20, 2002.

(51) Int. Cl.[7] .............................. C02F 9/08; C02F 1/20; C02F 1/24
(52) U.S. Cl. ..................... 210/704; 210/221.2; 210/207
(58) Field of Search .......................... 210/221.2, 221.1, 210/703, 704, 219, 188, 705, 706, 207, 205

(56) References Cited

U.S. PATENT DOCUMENTS

| | | | | |
|---|---|---|---|---|
| 2,274,658 A | * | 3/1942 | Booth | 210/703 |
| 3,147,217 A | * | 9/1964 | Halton | 210/705 |
| 4,170,797 A | * | 10/1979 | Sundberg | 4/300 |
| 4,251,371 A | * | 2/1981 | Bauer et al. | 210/197 |
| 4,659,458 A | * | 4/1987 | Chin et al. | 209/164 |
| 5,068,031 A | | 11/1991 | Wang | |
| 5,472,611 A | | 12/1995 | von Nordenskjold | |
| 5,500,135 A | * | 3/1996 | Smith et al. | 210/787 |
| 5,639,371 A | | 6/1997 | Loy | |
| 6,106,704 A | | 8/2000 | Drewery | |
| 6,165,359 A | | 12/2000 | Drewery | |

* cited by examiner

Primary Examiner—Duane Smith
Assistant Examiner—Douglas J. Theisen
(74) Attorney, Agent, or Firm—Collier Shannon Scott, PLLC

(57) ABSTRACT

A process for treating contaminated fluid is disclosed. An apparatus for treatment of contaminated fluid comprises: an integral tank; an inlet for introducing a mixture of flocculent polymer and contaminated fluid; a mixer in the bottom of an innermost cylinder that has first stage aerating means; a rotary skimmer above the fluid level of the innermost cylinder and a second stage aeration cylinder that has second stage aerating means surrounding the innermost cylinder; a de-aeration baffle on the same plane as the rotary skimmer and extending around an outermost cylinder; fluid level control means between the second stage aeration cylinder and the outermost cylinder, directing fluid flow from the second stage aeration cylinder out of the tank; means for powering the mixer and the rotary skimmer; and an outlet permitting clear fluid to exit the tank and an outlet permitting waste effluent to exit the tank.

11 Claims, 4 Drawing Sheets

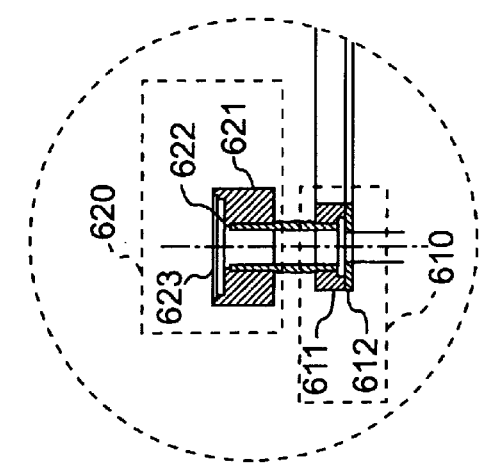
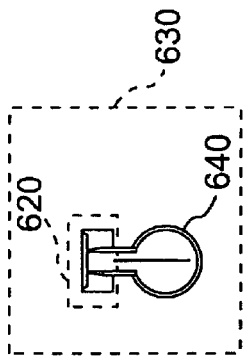
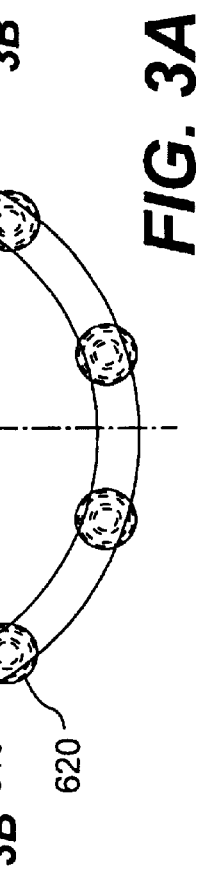
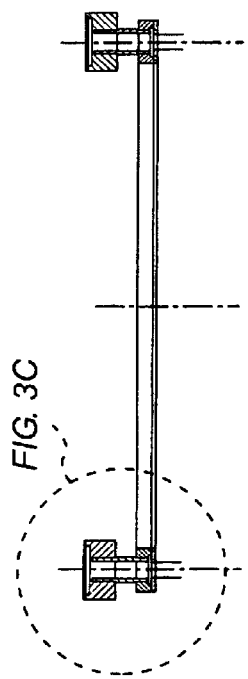

APPARATUS AND METHOD FOR THE TREATMENT OF A CONTAMINATED FLUID

CROSS-REFERENCE TO RELATED APPLICATIONS

The present invention relates to, and is entitled to the benefit of the earlier filing date and priority of, U.S. application Ser. No. 60/357,658, filed Feb. 20, 2002.

FIELD OF THE INVENTION

The present invention relates to an apparatus and process for separating contaminants from a fluid, such as wastewater. In particular, the present invention integrates components and processes into a single unit, providing for the formation and removal of a combination of flocculent polymer and contaminants (floc) from a contaminated fluid.

BACKGROUND OF THE INVENTION

Due to the continuous production of large amounts of wastewater and other contaminated fluids, there is a need to provide effective and economical purification of such fluids. Otherwise, these effluents would be introduced into the environment, potentially leading to undesirable environmental consequences. Accordingly, a variety of treatment systems have been developed to purify contaminated fluids.

Gravity separation and flotation are several of the various approaches used in fluid treatment systems. These conventional systems primarily rely on gravity clarification regions, in which heavy solids settle out of the fluid and are removed from the bottom of the treatment tank. Flotation may additionally be utilized, in which gas bubbles are employed to draw particulate matter to the surface, where it is skimmed off, typically by a scooping mechanism. Specifically, flocculent, which is a polymer used to remove contaminants from water, may be mixed with wastewater, so that it will combine with the contaminants in the fluid. This mixture of flocculent and contaminants creates floc particles, which may be aerated for flotation and then removed. Prior treatment systems often integrated these conventional components in series, sometimes with pipelines connecting the various regions. Such systems are expensive and require a large footprint.

For instance, Wang et al., U.S. Pat. No. 5,068,031, is directed to a sludge-treatment apparatus that uses flotation-gravity clarification. In particular, sludge is removed by a gravity clarification process in which heavy sludge, which settles to the bottom of the tank, is collected by a traveling scraper blade. Sludge is also removed by a flotation process in which floated scum from dissolved gas thickening is removed from the fluid surface by a sludge scoop collector.

U.S. Pat. No. 5,472,611 to von Nordenskjold et al. is directed to an apparatus and process for the purification of wastewater in several successive stages. The purification basin is divided into regions by separating walls and the water travels through each of these regions successively in the direction of current flow. In the first region the water is aerated, and then it is subjected to intermediate clarification using a sedimentation surface. The water finally travels through post-clarification aeration and sedimentation regions. Sludge is deposited and removed from the bottom of each of the sedimentation regions.

Loy, U.S. Pat. No. 5,639,371, is directed to an apparatus and process for aerating wastewater. The reactor comprises a basin that is divided into two aeration cells, which are connected in series. After the wastewater is sequentially treated in the aeration cells, it passes through an outlet to a clarifier in which solid materials settle out of the liquid.

Drewery, U.S. Pat. No. 6,106,704, is directed to a wastewater treatment system contained within a cylindrical tank, which has a top capping off its open end. Within the tank, Drewery teaches a clarifier compartment and an aeration compartment surrounding the clarifier compartment. The aeration compartment may contain two aerators. The apparatus further includes a platform on top of the tank, to which an air pump is affixed having an air line extending into the aeration compartment, and an access opening formed in the top.

Drewery, U.S. Pat. No. 6,165,359, is directed to a high strength wastewater treatment system. Specifically, this patent teaches a treatment system comprising two tanks connected by a pipeline. The first tank contains a first aerator, while the second tank contains a clarifier compartment and a second aerator. The pipe allows liquid to pass between the two tanks.

Each of the prior art references utilizes clarification regions for collecting solid materials that settle out of the liquid. Although flotation may also be utilized, the prior art systems skim off particulate matter having high water contents, typically with a scooping mechanism. A system is needed that includes a novel apparatus and process to remove contaminants from a liquid in an economical manner, without requiring large amounts of space. What is also needed is a wastewater treatment system that can integrate the components for wastewater treatment into a single unit. A system that allows for removal of floc comprised of less water content is also needed.

It is therefore an advantage of some, but not necessarily all, embodiments of the present invention to provide an apparatus and process for the treatment of contaminated fluids that integrates multiple components into a single unit for the formation and removal of floc from contaminated fluids. It is another advantage of embodiments of the present invention to provide an apparatus that alleviates the higher costs and greater footprint requirements of conventional wastewater treatment components. It is a further advantage of embodiments of the present invention to provide an apparatus that uses a rotary skimmer rather than filtration for floc separation. It is another advantage of embodiments of the present invention to provide an apparatus with a rotary skimmer and aeration design that allows for removal of floc comprised of a reduced water content than achievable with known systems. It is yet another advantage of embodiments of the present invention to provide an apparatus with first stage aerating means for improved dispersion of microbubbles and reduction of turbulence above a mixing zone. It is still yet another advantage of embodiments of the present invention to provide an apparatus that maximizes the density of accumulated floc in a waste tank, so that the floc may flow out of the tank.

Additional advantages of various embodiments of the invention are set forth, in part, in the description that follows and, in part, will be apparent to one of ordinary skill in the art from the description and/or from the practice of the invention.

SUMMARY OF THE INVENTION

Responsive to the foregoing challenges, Applicant has developed an innovative apparatus for the treatment of a contaminated fluid, comprising: an integral tank; with an inlet in the tank for introducing a mixture of flocculent polymer and a contaminated fluid into the tank; a mixer, located in a bottom region of an innermost cylinder in the tank; first stage aerating means, located within the innermost cylinder; a rotary skimmer, located above the fluid level of the innermost cylinder and a second stage aeration cylinder surrounding the innermost cylinder; second stage aerating means, located within the second stage aeration cylinder; a de-aeration baffle, located on the same plane as the rotary skimmer and extending around an outermost cylinder; fluid level control means, located between the second stage aeration cylinder and the outermost cylinder, directing fluid flow from the second stage aeration cylinder out of the tank; means for powering the mixer and the rotary skimmer; a first outlet for permitting clear fluid to exit the tank; and a second outlet for permitting waste effluent to exit the tank.

Applicant has also developed an innovative method for treating a contaminated fluid, comprising the steps of: introducing a mixture of a flocculent and the contaminated fluid into an innermost cylinder of a tank having a mixer located therein; aerating the mixture as it proceeds upward through the innermost cylinder; skimming the aerated floc formed by the flocculent and the contaminants; aerating the mixture as it proceeds downward through a second cylinder surrounding the innermost cylinder; and directing the fluid flow from the second cylinder out of the tank as a decontaminated fluid. The method may further comprise the steps of: de-aerating the skimmed floc by directing it across the surface of a de-aeration baffle into a waste tank; and accumulating the floc in the waste tank as a higher density fluid until it is released through an outlet in the tank.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

FIG. 3 is a cross-sectional view of the second stage aerating means of an embodiment of the present invention, depicting the components of the aeration ring assembly.

DETAILED DESCRIPTION OF EMBODIMENTS OF THE INVENTION

Figure 1:
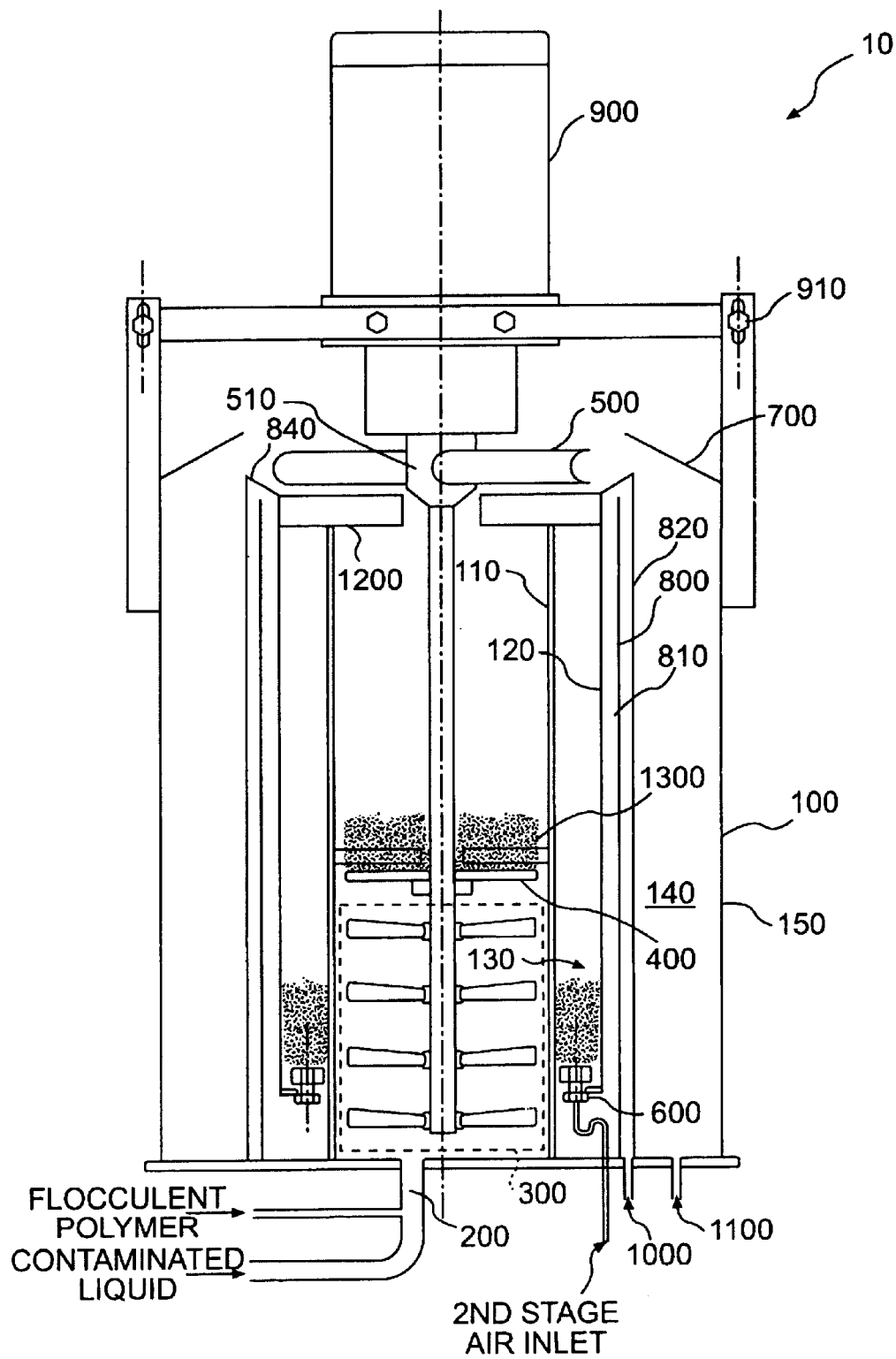
FIG. 1 is an illustration of an apparatus for the treatment of contaminated fluids in accordance with an embodiment of the present invention, depicting the integrated tank and its associated components.

Reference will now be made in detail to an embodiment of the present invention, an example of which is illustrated in the accompanying drawings. With reference to FIG. 1, the apparatus for the treatment of contaminated fluids 10 may comprise a single integral tank 100 with an inlet 200 for fluids to enter tank 100 and two outlets 1000, 1100 for fluids to exit tank 100. Within tank 100, the apparatus may include a mixer 300, means for first and second stage aerating 400, 600, a rotary skimmer 500, a de-aeration baffle 700, and fluid level control means 800. The apparatus 10 may further include means for powering 900 skimmer 500 and mixer 300, which may also power first stage aerating means 400.

Vertical skimmer adjustment 910 may allow for the control of floc wetness during the skimming operation by fixing the distance between the fluid level (controlled by fluid level column cylinder 800) and the height at which skimming takes place.

Inlet 200 in tank 100 may permit a mixture of flocculent and a contaminated fluid, such as wastewater or other contaminated fluids to enter an innermost cylinder 110 of tank 100. Mixer 300 may be located in the bottom region of cylinder 110 for mixing the flocculent and contaminated fluid and sending the mixture upward through cylinder 110 toward first stage aerating means 400.

Figure 2:
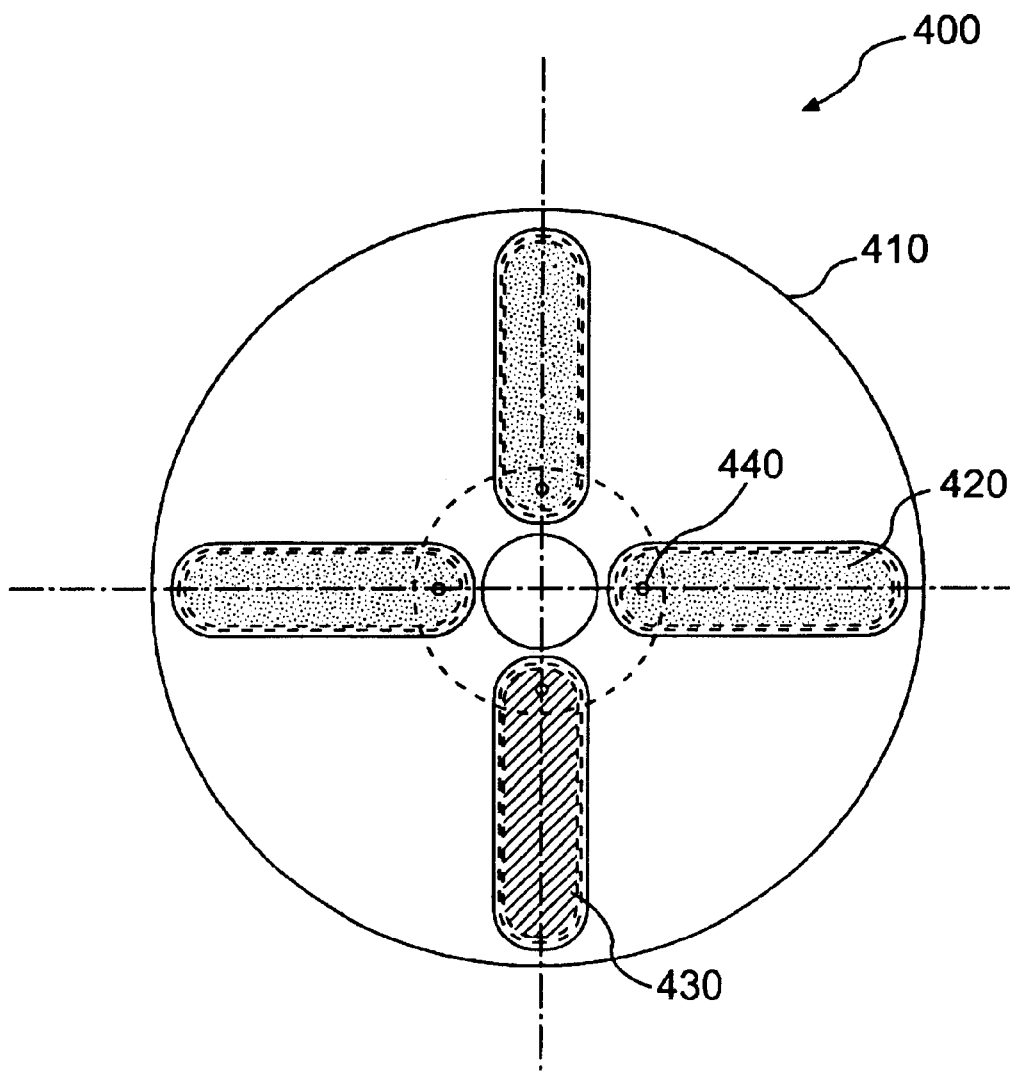
FIG. 2 is a cross-sectional view of the first stage aerating means of an embodiment of the present invention, depicting the components of the rotary aerator.

In an embodiment of the present invention, means for first stage aeration 400 may comprise a rotary aerator, as depicted in FIG. 2, which may be located within innermost cylinder 110 of tank 100. Rotary aerator 400 may introduce microbubble aeration into a mixture of flocculent polymer and contaminants ("floc") to enhance the flotation of the floc. Rotary aerator 400 may comprise a circular disc 410 having a sintered diffuser material 420 inserted over a plurality of plenum chambers 430. Rotary aerator 400 may disperse micro-bubbles into the mixture of fluids contained within innermost cylinder 110 in the region above rotary aerator 400. In another embodiment, first stage aerating means 400 may comprise a fixed, non-rotating aerator. First stage aerating means 400, whether comprised of rotary or fixed aeration, may be supplied compressed air or other gas compositions that may enhance performance. Air may be supplied to each plenum region 430 below sintered diffuser material 420 through a passage 440 below each plenum 430.

In another embodiment, first stage aerating means 400 may comprise a rotary aerator having a cylindrical porous air diffuser. An outer shell may surround a portion of the cylindrical air diffuser and extend radially beyond the diffuser into innermost cylinder 110. The outer shell may scoop the floc mixture as it flows past the aerator, which may assist in the aeration of the mixture.

Second stage aerating means 600, as depicted in FIG. 3, may comprise a circular air distribution manifold 610 that extends around the bottom region of second stage aeration region 130. This annular aeration region 130 may comprise an inside cylinder 110 and a second stage aeration cylinder 120. Air distribution manifold 610 may comprise an upper and lower ring 611, 612 configured so as to provide compressed air to a plurality of diffuser nozzle assemblies 620 positioned around air distribution manifold 610. In another embodiment 630, air distribution manifold 640 may comprise a tubular ring 640 to which diffuser nozzles 620 are connected.

Rotary skimmer 500 may be located within tank 100 and above the fluid level within innermost cylinder 110 and second stage aeration cylinder 120. Skimmer blades 500 may skive the floc at a level above the fluid. The height of skimmer blades 500 over the fluid may be established by vertical adjustment 910, which communicates with rotary skimmer 500. Vertical skimmer adjustment 910 may allow for the control of floc wetness during the skimming operation by fixing the distance between the fluid level (controlled by fluid level column cylinder 800) and the height at which skimming takes place. If the height of skimmer 500 is adjusted to be low, or close to the fluid level, the floc that is skimmed will be wet. As the height of skimmer 500 increases above the fluid level, the fluid content (wetness) in the skimmed floc decreases.

The fluid level within second stage aeration cylinder 120 may be controlled by a weir arrangement. In particular, fluid may flow upward through a fluid column plenum 810, which may be contained between second stage aeration cylinder 120 and a fluid level column cylinder 800. Setting the height of fluid level column cylinder 800 determines the level of the fluid within second stage aeration cylinder 120 and fluid level column cylinder 800. Fluid then may flow downward through a column contained between fluid level column cylinder 800 and a fluid containment cylinder 820, until it flows through first outlet 1000 and exits tank 100 as clear fluid.

Outermost waste fluid containment cylinder 150 may surround all concentric cylinders contained within: innermost cylinder 110; second stage aeration cylinder 120; fluid level control cylinder (weir) 800; and fluid containment cylinder 820.

De-aeration baffle 700, which may be located on the same plane as rotary skimmer 500, extends around outermost cylinder 150. Floc may be de-aerated as it travels across a tank baffle 840, which is the top of the weir column arrangement, de-aeration baffle 700, and into waste tank 140. Outermost cylinder 150 may comprise the outer wall of waste tank 140 into which floc that has been skimmed and de-aerated is accumulated for release through second outlet 1100 as a fluid.

Finally, means for powering 900 rotary skimmer 500 and mixer 300 may comprise a single drive motor, or any other suitable device or system. Motor 900 may also power first stage aerating means 400. If first stage aerating means 400 includes a rotary aerator, then motor 900 may power skimmer 500, aerator 400, and mixer 300. If first stage aerating means 400 is fixed, however, motor 900 will not be necessary to provide power to aerator 400, and may only be used to power skimmer 500 and mixer 300.

Figure 4:
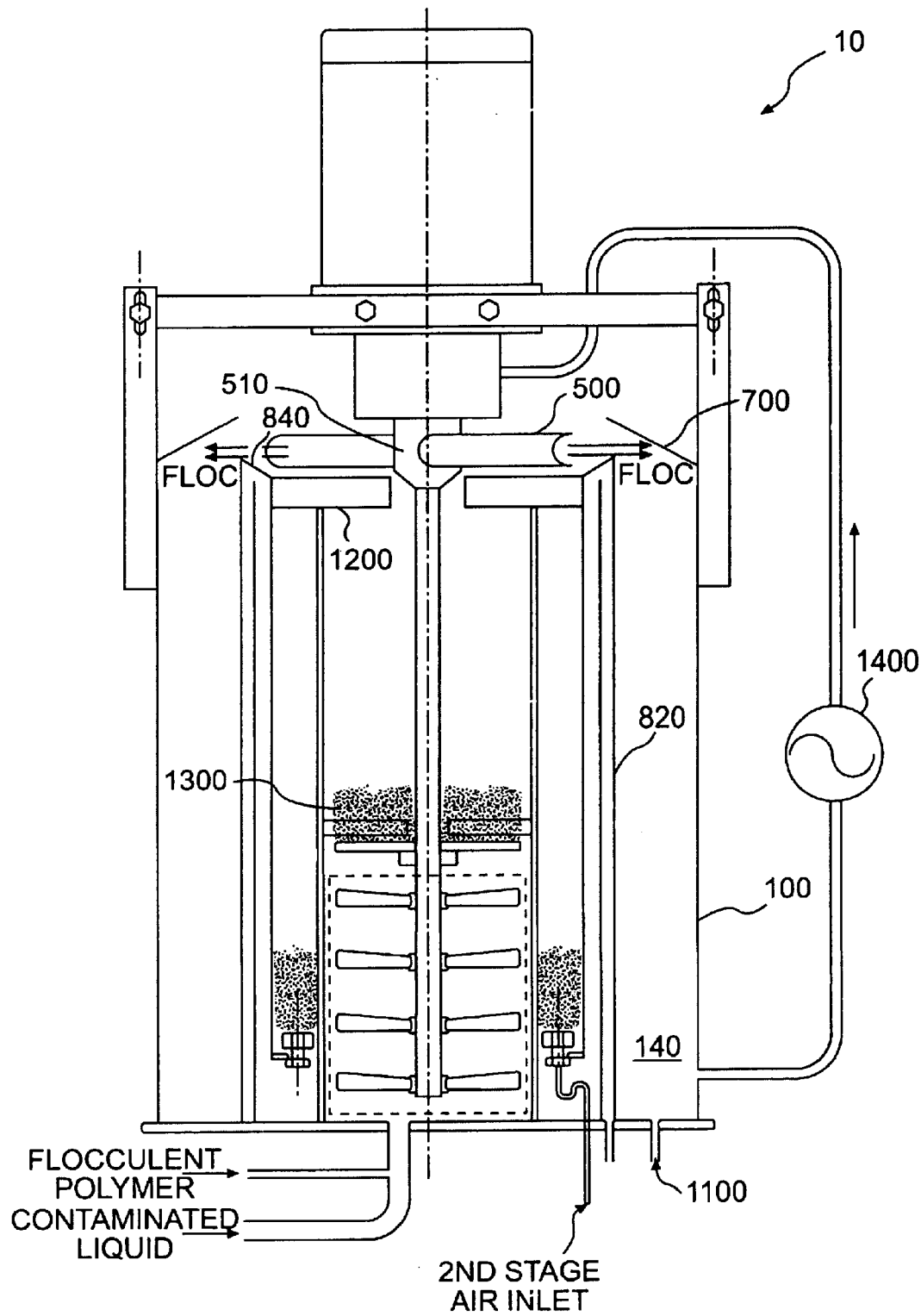
FIG. 4 is an illustration of another embodiment of the apparatus for the treatment of contaminated fluids, including a pump and fluid flushing system.

In another embodiment of the present invention, as depicted in FIG. 4, the apparatus for treatment of contaminated fluid 10 may include a pump and flushing fluid system 1400, which may be either located inside or outside tank 100. System 1400 may be used to pump wet floc of high fluid content from a lower region of outermost cylinder, or waste tank 140. The floc that is pumped may have high fluid content. This wet floc may act as a flushing fluid to prevent fouling or contaminant accumulation on skimmer blades 500 and surfaces of tank 100. This flushing fluid may be introduced into rotating head 510 of rotary skimmer 500. Rotating head 510 may direct the flow of the flushing fluid to the blades of skimmer 500, thereby flushing the skimmed floc from the blades, over tank baffle 840, along de-aeration baffle 700, and into waste tank 140. This system may help prevent aerated floc from accumulating on the blades of skimmer 500 and provide inertia to the floc so that it is effectively accelerated across de-aeration baffle 700 and into waste tank 140. Air may be released from the floc as it travels across de-aeration baffle 700 with the fluid, so that the floc may be collected as a higher density fluid. Additionally, the wet floc pumped out of waste tank 140 as the flushing fluid may be further de-aerated, so that it also may become a higher density fluid that exits waste tank 140.

Another embodiment of the present invention may include a stationary primary dam 1200, as shown in FIG. 1, located above the fluid level of innermost cylinder 110 and below rotary skimmer 500. Primary dam 1200 may prevent floc from rotating with skimmer 500. This may be helpful when skimmer 500 is rotating at slower speeds. Primary dam 1200 may be of any size, shape, material, or design.

Another embodiment of the present invention may also include a secondary stationary dam 1300, as shown in FIG. 1, located above first stage aerating means 400 within innermost cylinder 110. Secondary dam 1300 may prevent circular flow patterns of the fluid above first stage aerator 400, which may impede the formation of floc. Secondary dam 1300 may be of any size, shape, material, or design.

The operation of an embodiment of the apparatus will now be described. With reference to FIG. 1, a mixture of flocculent and contaminated fluid may be introduced into innermost cylinder 110 through inlet 200 in tank 100. The mixture may be introduced at a fixed flow rate to mixer 300, which is in the bottom region of innermost cylinder 110. Mixing time may be fixed by the axial flow rate of the mixture through the mixing zone.

The mixture may proceed upward through innermost cylinder 110, reaching rotary aerator 400. First stage aerator 400 may introduce micro-bubble aeration to the mixture. This aeration may increase the flotation of the floc being produced and also serve to dry the floc that is floating beneath skimmer 500.

The aerated floc may continue its vertical ascent toward rotary skimmer 500, which skives the floc at a level above the fluid. The fluid flow may proceed radially below the buoyant floc, over innermost cylinder 110, and into second stage aeration region 130. The fluid may continue downward through aeration region 130 against a counter-flow of aeration bubbles, released by second stage aerating means 600, which may be an aeration ring assembly, as shown in FIG. 3. During second stage aeration, air may be supplied to each diffuser assembly 620 by air distribution manifold 610. Air may enter each diffuser assembly 620 through diffuser body 621 and pass into diffuser plenum 622 below sintered diffuser disc 623. The compressed air then may pass through diffuser disc 623 creating micro-bubbles that enhance the vertical entrainment and flotation of the wet floc. In addition, air bubbles may also serve to dry the floc that is floating beneath skimmer 500.

After reaching the bottom of aeration region 130, the fluid flow may reverse direction and proceed upward through fluid column plenum 810. The direction of the fluid flow then may reverse again after passing over the top of fluid level column cylinder 800 and proceed downward until it is discharged as decontaminated fluid through outlet 1000 at the bottom of tank 100.

Meanwhile, the skimmed floc may proceed over tank baffle 840, across de-aeration baffle 700, and into waste tank 140. The floc may release air as it travels across the surface of baffle 700. The floc may be accumulated in waste tank 140 as a higher density fluid, which may accumulate in tank 140 until it is released through outlet 1100.

In another embodiment of the present invention, illustrated in FIG. 4, a pump and flushing fluid system 1400 may be included in the operation of the apparatus for treating contaminated fluids 10. Wet floc, which acts as a flushing fluid, may be pumped by system 1400 from the lower region of waste tank 140 and introduced to skimmer blades 500 through a rotating head 510. Skimmer blades 500 may direct the flushing fluid and skimmed floc over tank baffle 840, across de-aeration baffle 700, and into waste tank 140. Floc may be prevented from accumulating on skimmer blades 500, tank baffle 840, de-aeration baffle 700, and surfaces of tank 100 by this flushing process. Air may be released from the floc as it passes across the extended surface area of de-aeration baffle 700 and down the sides of waste tank 140. The floc may be accumulated as a relatively high-density fluid and released from waste tank 140 through outlet 1100.

It will be apparent to those skilled in the art that variations and modifications of the present invention can be made without departing from the scope or spirit of the invention. Thus, it is intended that the present invention cover all such modifications and variations of the invention, provided they come within the scope of the appended claims and their equivalents.

What is claimed is:

1. An apparatus for the treatment of a contaminated fluid, comprising:
   an integral tank;
   an inlet for introducing a mixture of a flocculent and a contaminated fluid into said tank;
   a mixer, located in a bottom region of an innermost cylinder in said tank;
   first stage aerating means, located within said innermost cylinder;
   a rotary skimmer, located above the fluid level of said innermost cylinder and a second stage aeration cylinder surrounding said innermost cylinder;
   second stage aerating means, located within said second stage aeration cylinder;
   a de-aeration baffle, located on the same plane as said rotary skimmer and extending around an outermost cylinder;
   fluid level control means, located between said second stage aeration cylinder and said outermost cylinder, directing fluid flow from said second stage aeration cylinder out of said tank;
   powering means for powering said mixer and said rotary skimmer;
   a first outlet for permitting clear fluid to exit said tank; and
   a second outlet for permitting waste effluent to exit said tank.

2. The apparatus according to claim 1, wherein said powering means further powers said first stage aerating means.

3. The apparatus according to claim 1, further comprising skimmer height adjustment means for controlling water content of floc.

4. The apparatus according to claim 1, further comprising:
   a rotating head of said rotary skimmer;
   a pump; and
   transporting means for transporting fluid extracted by said pump from a lower region of said outermost cylinder to said rotating head for introduction into said tank as a flushing fluid.

5. The apparatus according to claim 1, further comprising a primary stationary dam located above the level of fluid in said innermost cylinder and below said rotary skimmer.

6. The apparatus according to claim 1, further comprising a secondary stationary dam located above the first stage aerating means within said innermost cylinder.

7. A wastewater separator unit, comprising:
   an integral tank;
   an inlet for introducing a mixture of flocculent polymer and wastewater into said tank;
   a mixer, located in a bottom region of an innermost cylinder in said tank;
   first stage aerating means, located within said innermost cylinder;
   a rotary skimmer, located above the water level of said innermost cylinder and a second stage aeration cylinder surrounding said innermost cylinder;
   second stage aerating means, located within said second stage aeration cylinder;
   a de-aeration baffle, located on the same plane as said rotary skimmer and extending around an outermost cylinder;
   fluid level control means, located between said second stage aeration cylinder and said outermost cylinder, directing water flow from said second stage aeration cylinder out of said tank;
   powering means for powering said mixer and said rotary skimmer;
   a first outlet for permitting clear water to exit said tank; and
   a second outlet for permitting waste effluent to exit said tank.

8. The apparatus according to claim 7, wherein said powering means further powers said first stage aerating means.

9. The apparatus according to claim 7, further comprising skimmer height adjustment means for controlling water content of floc.

10. A method for treating a contaminated fluid, comprising the steps of:
    introducing a mixture of a flocculent and the contaminated fluid into an innermost cylinder of a tank having a mixer located therein;
    aerating the mixture as it proceeds upward through the innermost cylinder;
    skimming the aerated floc formed by the flocculent and the contaminants;
    aerating the mixture as it proceeds downward through a second cylinder surrounding the innermost cylinder; and
    directing the fluid flow from the second cylinder out of the tank as a decontaminated fluid.

11. The method according to claim 10, further comprising the steps of:
    de-aerating the skimmed floc by directing it across the surface of a de-aeration baffle into a waste tank; and
    accumulating the floc in the waste tank as a higher density fluid until it is released through an outlet in the tank.

* * * * *